(12) United States Patent
Nash

(10) Patent No.: US 6,236,324 B1
(45) Date of Patent: May 22, 2001

(54) ELASTIC PLATE LIQUID LEVEL SENSOR

(76) Inventor: Lawrence V. Nash, P.O. Box 270, Wedderburn, OR (US) 97491

( * ) Notice: Subject to any disclaimer, the term of this patent is extended or adjusted under 35 U.S.C. 154(b) by 0 days.

(21) Appl. No.: 09/540,279

(22) Filed: Mar. 31, 2000

(51) Int. Cl.$^7$ .................................................. G08B 21/00
(52) U.S. Cl. ........................ 340/619; 340/612; 340/618; 340/623; 73/290 R; 73/307; 73/309
(58) Field of Search ..................... 340/612, 618, 340/619, 623, 624; 73/313, 290 R, 291, 307, 309

(56) References Cited

U.S. PATENT DOCUMENTS

| | | | |
|---|---|---|---|
| 3,662,131 | 5/1972 | Leistiko | 200/84 B |
| 3,686,451 | 8/1972 | Pottharst, Jr. | 200/84 R |
| 3,939,383 | 2/1976 | Alm | 361/178 |
| 4,019,387 | 4/1977 | Siegel | 73/299 |
| 4,052,900 | 10/1977 | Ganderton | 73/313 |
| 4,069,838 | 1/1978 | Hansel | 137/392 |
| 4,075,616 | 2/1978 | Rait | 340/666 |
| 4,086,457 | 4/1978 | Niedermeyer | 200/84 R |
| 4,483,192 | 11/1984 | Wachter | 73/311 |
| 4,804,944 | * 2/1989 | Galladay et al. | 73/293 |
| 4,821,569 | 4/1989 | Soltz | 73/290 V |
| 4,836,632 | 6/1989 | Bardoorian | 250/227.11 |
| 4,843,876 | 7/1989 | Holm | 73/309 |
| 4,843,883 | 7/1989 | Glover | 73/301 |
| 4,875,370 | 10/1989 | Spitzer | 73/309 |
| 4,901,245 | 2/1990 | Olson | 702/54 |
| 5,006,044 | * 4/1991 | Walker et al. | 412/12 |
| 5,065,037 | 11/1991 | Finney | 250/577 |
| 5,132,923 | 7/1992 | Crawford | 702/51 |
| 5,250,768 | 10/1993 | Van Fossen | 200/84 R |
| 5,562,422 | 10/1996 | Ganzon | 417/40 |
| 5,684,296 | * 11/1997 | Hamblin | 250/227.11 |
| 5,939,688 | 8/1999 | Hutchinson | 200/81.9 R |
| 5,950,487 | * 9/1999 | Maresca et al. | 73/293 |
| 6,057,772 | * 5/2000 | Burkett | 340/612 |

* cited by examiner

Primary Examiner—Daryl C. Pope

(57) ABSTRACT

A liquid level sensor intended to be placed in a tank or sump. The Sensor includes a displacer attached to one side of an elastic plate and an optical shutter blade attached to the other side. The shutter blade contains an aperture. When the displacer is not in contact with the liquid whose level is to be measured, the aperture is positioned on the optical axis of an optoelectronic slot switch, allowing radiant energy from the emitter in the switch to irradiate the sensor in the switch. When the displacer is immersed in the liquid, a moment force is created that deforms the plate, causing the aperture to move off of the switch optical axis and the shutter blade to block the radiant energy. The elastic plate constitutes part of one surface of a liquid-tight housing. The shutter and slot switch are located inside the housing.

6 Claims, 4 Drawing Sheets

ELASTIC PLATE LIQUID LEVEL SENSOR

CROSS REFERENCES TO RELATED APPLICATIONS

There are no cross references to related applications.

BACKGROUND OF THE INVENTION

This invention relates to liquid level measurement, particularly in tanks, sumps and bilges.

Liquid level sensors are used in liquid containment tanks and sumps to operate pumps that control the level of liquid in the tank or sump. They are also used to provide an alarm if the liquid reaches certain critical levels. Liquid level sensors are used in:

Septic Tanks
Industrial Liquids Storage Tanks
Marine Bilge Pumping Systems
Sump Pumping Systems
Potable Water Storage Tanks Many of the presently-employed liquid level sensors use a moving float to activate electromechanical switches which control pump motors. In some of these devices the float is hinged, in others it is constrained to move up and down inside of a chamber that allows entry of the liquid whose level is to be measured. The float mechanisms are the least reliable component in these systems. The following quote is from Photonics Magazine, November 1999 Issue, Page 76:

"Level Measurement: In septic tanks, floats control the pumps that regulate the flow of water. The floats are a weak link in the system and often fail. We need an alternative technology to measure the liquid level in the septic tank and to control the pumps when the water reaches the target level. The liquid has a nearly neutral pH, but contains foam, suspended solids and biological solids, so the measurement technology must tolerate these interferences as well as be reasonably economical. Jack Firkins, Product Manager, Orenco Systems Inc., Sutherlin, Oreg."

Examples of hinged float devices are to be found in:

| | |
|---|---|
| Leistiko | U.S. Pat. No. 3,662,131 |
| Niedermeyer | U.S. Pat. No. 4,086,457 |
| Van Fossen | U.S. Pat. No. 5,250,768 |
| Hutchinson | U.S. Pat. No. 5,939,688 |
| Pottharst | U.S. Pat. No. 3,686,451 |

Some disadvantages of the devices described by Leistiko, Niedermeyer and Van Fossen are that they require a lot of space for the rotation of the float about its hinge and that they cannot measure small changes in liquid level. In addition, Leistiko and Niedermeyer use mercury switches, which are a potential hazard in the event of failure, when used in potable water systems.

Van Fossen describes a complex mechanical switch with pivots, cams and other moving parts that are subject to wear and failure.

Both Hutchinson and Poftharst describe a pivot arm of a float that penetrates the wall of the liquid containment vessel, which is not practical in many types of installations, buried tanks being one example. The required resilient seal at the penetration is difficult to fabricate and prone to failure.

Liquid level sensors that use moving floats constrained in or by chambers are described in:

| | |
|---|---|
| Ganderton | U.S. Pat. No. 4,052,900 |
| Ganzon, et. al. | U.S. Pat. No. 5,562,422 |
| Bardoorian | U.S. Pat. No. 4,836,632 |

In both Ganderton and Ganzon, solids suspended in the liquid can interfere with the movement of the float in the float chamber, causing the devices to fail. In Bardoorian, the float slides on the outside of a chamber, but is also susceptible to interference by suspended solids. Bardoorian also describes a complex magnetic linkage between a magnet on the float on the outside of the chamber and a mirror attached to a magnet on the inside of the chamber.

Wachter, U.S. Pat. No. 4,483,192, describes a displacer attached to the unsupported end of a cantilever beam. Buoyant force acting on the displacer causes bending of the beam. The beam is instrumented with one or more strain gauges. A strain gauge-instrumented beam is expensive to fabricate. It is necessary but difficult to electrically and chemically insulate the external strain gauge(s) from the liquid being measured. Strain gauges require sophisticated, expensive electronics to create reliable binary (switching) signals from their low-amplitude analog signal output.

Examples of liquid level sensors that use differential pressure-responsive diaphragms are:

| | |
|---|---|
| Alm | U.S. Pat. No. 3,939,383 |
| Siegel | U.S. Pat. No. 4,019,387 |
| Glover, et. al. | U.S. Pat. No. 4,843,883 |

A disadvantage of this type of liquid level sensor is that the diaphragms used have to be excessively large to activate switches, in the typical application where the liquid level changes are not large. All three of these implementations require complex mechanical linkages to produce a switching action.

Still another type of liquid level sensor measures the change in apparent weight of a displacer suspended in the liquid containment tank. Examples of this type are given in:

| | |
|---|---|
| Holm | U.S. Pat. No. 4,843,876 |
| Spitzer | U.S. Pat. No. 4,875,370 |
| Crawford, et. al. | U.S. Pat. No. 5,132,923 |

A disadvantage of all three of these implementations is that the displacer must extend throughout the vertical range of levels that it is desired to measure, making the displacer quite large in many cases. An additional disadvantage in Holm and Crawford is the requirement for a complex transducer for weighing the displacer (from which the displacer is suspended) and the associated expensive electronics to calibrate the transducer and convert its output to a switch control signal. In Spitzer, the suspension system for the displacer is an expensive and complex conditionally-stable closed-loop feedback control system (a servomechanism), requiring an electromagnet capable of suspending the displacer and a position pickoff to determine its position.

Still another type of liquid level sensor relies on measurement of the propagation of optical energy through the liquid. Examples of this type of sensor are found in:

| | |
|---|---|
| Hansel, et. al. | U.S. Pat. No. 4,069,838 |
| Rait | U.S. Pat. No. 4,075,616 |
| Finney, et. al. | U.S. Pat. No. 5,065,037 |

Hansel relies on a gap in an optical path being filled by the liquid to be measured, the liquid altering the optical transmission characteristics of the path. A disadvantage of this approach is that suspended solids can precipitate out of the liquid over time, changing the optical transmission characteristics of the path.

Rait relies on the presence of the liquid interfering with the detection of light from an optical source. Again, suspended solids can precipitate out onto the optical surfaces, interfering with the detection process whether the liquid is present or not.

In Finney, optical measurements are made by passing light through a chamber which is filled with the liquid whose level is to be measured. Again, solids precipitating onto the chamber windows can cause serious error in the measurements.

All three of the above implementations require relatively complex and expensive electronics to create a reliable switching signal from the low-amplitude analog outputs of the optical detectors.

Still another type of liquid level sensor utilizes measurement of the propagation-time of acoustic or ultrasonic energy. Typically, the energy is caused to reflect from the liquid surface and the time from transmission of the energy to reception of the echo is measured, as in Sonar systems. Examples of this technique are:

| | |
|---|---|
| Soltz | U.S. Pat. No. 4,821,569 |
| Olson, et. al. | U.S. Pat. No. 4,901,245 |

These systems tend to be expensive due to the requirement for high-power ultrasonic transmitters and complex signal processing hardware and software to differentiate between the desired echo and spurious echos from other parts of the tank. Their accuracy varies as a function of the shape and size of the tank, the liquid level and the presence of structures in the tank. Often they have to be calibrated to the specific tank.

The above-described prior art liquid level sensors are generally overly complex, unreliable, unsuited to the conditions found in many liquid level measurement applications, require excessive space for installation or are expensive to manufacture. What is needed therefore is a simple, low-cost and small liquid level sensor that can function reliably in liquid environments that cause problems for prior art devices.

SUMMARY OF THE PRESENT INVENTION

The present invention uses a displacer (a buoyant force generator) attached by means of a short trunnion to the center of an elastic plate. The elastic plate thickness is much smaller than its other dimensions. The elastic plate is fixed around its entire periphery. Due to the very small range of motion of the displacer and the elastic plate, the present invention is well-suited for use in viscous liquids or liquids containing suspended solids that can interfere with the operation of hinged or sliding floats.

The elastic plate is part of one surface of a closed compartment that is sealed against entry of the liquid whose level is to be measured. the invention is installed in the tank or sump in a manner such that the elastic plate is in a vertical plane. The displacer is symmetrical about an axis perpendicular to the elastic plate.

The displacer, elastic plate and the closed compartment may all be constructed of a polymer (a plastic) material for low-cost and suitability in corrosive environments, or may be constructed of a material such as stainless steel (for high-temperature applications). The modulus of elasticity, yield strength and commonly-available or readily-formable thicknesses make both certain polymers (such as Polyvinyl Chloride (PVC) Type 1) and certain stainless steels suitable materials.

A shutter blade is located inside the compartment attached to the center of the inside surface of the elastic plate (opposite the trunnion). The shutter blade is an elongate member in a plane that is normal to the plane of the elastic plate. The shutter blade has a small hole (an optical aperture) near the end furthest from the elastic plate. When the center of the elastic plate is deformed by the trunnion (due to the buoyant force of the displaced liquid acting on the displacer), the aperture will move through an arc of a circle, the radius of which extends from the center of the elastic plate to the aperture.

In the preferred version of the invention, a commercially-available solid-state optoelectronic slot switch is located inside the closed compartment in a manner such that the shutter blade can move within the slot of the slot switch, but without touching any of the switch's surfaces. The closed compartment also prevents solids suspended in the liquid from precipitating out onto the slot switch's optical surfaces.

The slot switch contains an emitter (on one side of the slot) facing a sensor (on the other side of the slot). The radiation emitted may be in either the infra-red or visible portion of the spectrum, the slot switch may contain additional electronic circuitry to convert the sensor output to standardized digital circuit switching voltages or currents, thereby being capable of interfacing directly with digital controllers and pump motor control circuits. The slot switch may also contain electronic circuitry to introduce hysteresis in the sensed switch transition, to reduce oscillations about the switching point. The OPTEK Inc. OPB970T11 is representative of this type of optoelectronic slot switch.

In other versions of the invention, separate emitter and sensor components are assembled into mounting structure to perform the same function as the slot switch.

The slot switch is positioned with its optical axis in a plane normal to the plane of the shutter blade. The slot switch is aligned so that, when the liquid whose level is to be measured in not in contact with the displacer, the aperture of the shutter blade is on the optical axis of the switch, enabling energy radiated from the emitter to be detected by the sensor.

The displacer is sized such that, when the displacer is immersed in the liquid, the aperture of the shutter blade is displaced a sufficient distance so that essentially none of the energy from the emitter is able to impinge on the sensor (the energy is blocked by the opaque shutter blade material).

A typical liquid level control system would use two liquid level sensors of the present invention. Each sensor would be installed in the tank or sump with the shutter blade and the elastic plate in vertical planes. One liquid level sensor would be positioned at the level at which it is desired to have the pump turn "on". The other liquid level sensor would be at the level at which it is desired to have the pump turn "off".

The present invention occupies less space in the tank or sump than many of the prior art hinged liquid level sensors that require both space for the sensor itself and its range of motion. The present invention is simple. There is only one active electronic component; the slot switch.

The present invention is inherently reliable: The moving parts move only minute distances and do not contact any parts other than those to which they are affixed. (The largest deflection of the elastic plate need not be greater than one-half of its thickness.) There are no components in the invention that generate sliding or rolling friction.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 4a shows the relative positions when the displacer is not in contact with the liquid. FIG. 4b shows the relative positions when the displacer is immersed in the liquid.

DETAILED DESCRIPTION OF THE INVENTION

Figure 1:
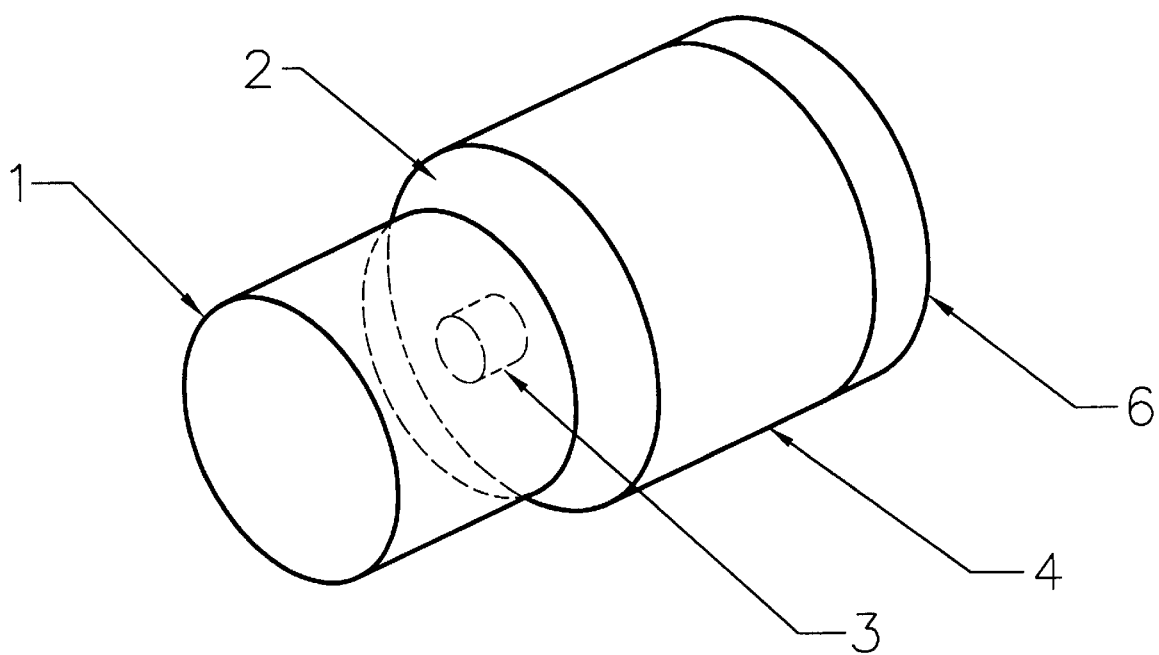
FIG. 1 is a simplified perspective drawing of the invention.

Referring to FIG. 1, the invention includes a displacer 1, attached to one side of an elastic plate 2 by means of a trunnion 3. The trunnion 3 is a solid cylinder.

The elastic plate 2 is part of one end of a housing 4. The opposite end of the housing 4 is closed by a removable housing cover 6. The elastic plate 2 is made from an elastic material such as a polymer (a "plastic") or steel, and has a thickness much smaller than its diameter. The invention is intended to be installed in a tank or sump with the elastic plate 2 in a vertical plane. The displacer 1, the trunnion 3 and the elastic plate 2 are coaxial.

The displacer 1, the trunnion 3, the housing 4 and the cover 6 are shown in FIG. 1 as cylindrical in shape. The invention is not limited to this shape. Other shapes, such as rectangular, are feasible without decreasing the efficacy of the invention. The cylindrical configuration is preferred for ease of construction and analysis.

The invention is installed by attaching either the housing 4 or the cover 6 to a support inside a tank or sump. The invention is capable of functioning when submerged for an indefinite period.

Figure 2:
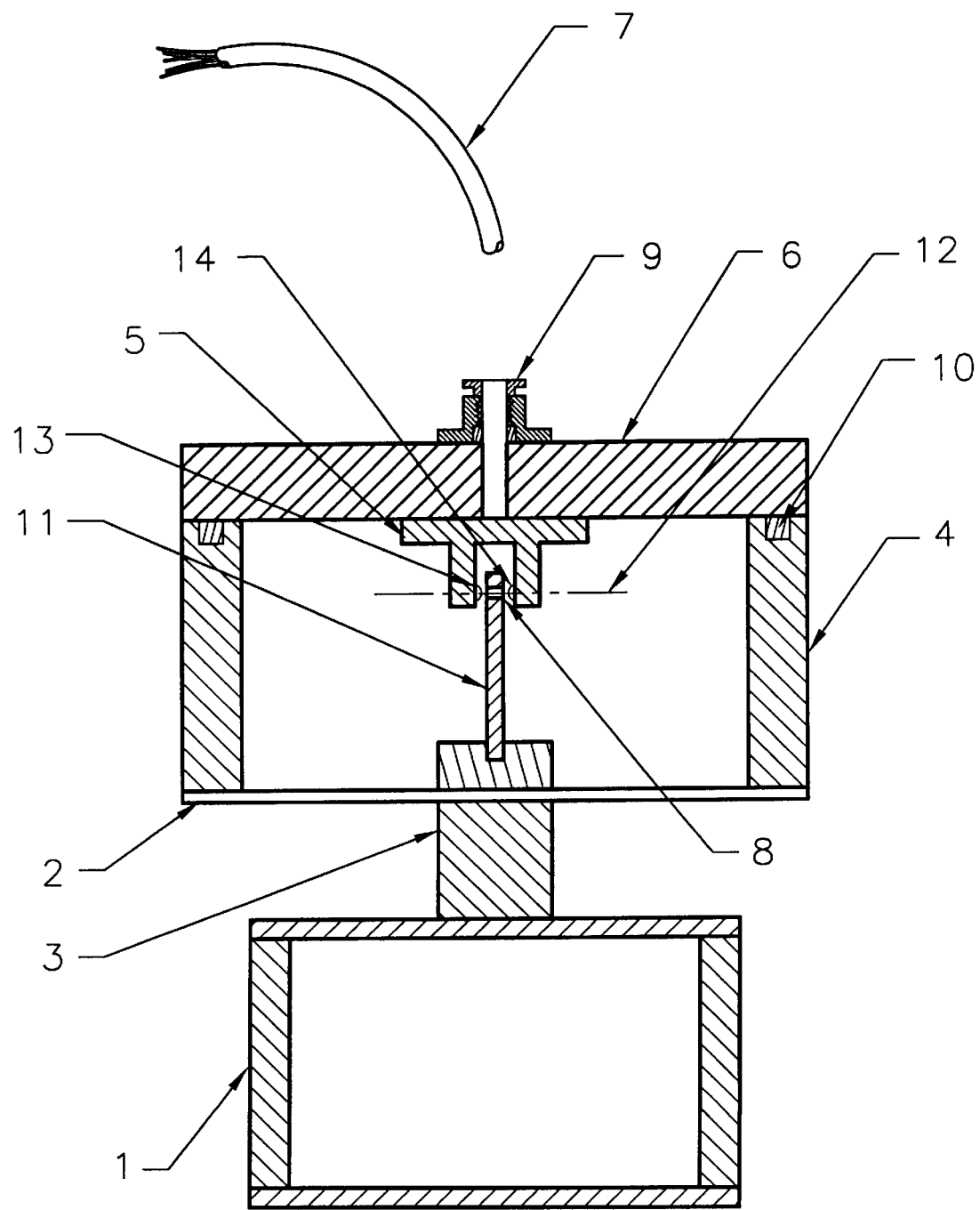
FIG. 2 is a section view of the invention, the section taken through the center of the invention in a plane perpendicular to the plane of the shutter blade. This plane is horizontal in the normal use of the invention.

FIG. 2 shows those parts of the invention that are inside the housing 4. The housing 4 is liquid-tight when the cover 6 is attached, using the o-ring 10. The housing 4 contains the optical and electronic parts of the invention. The housing 4, with the cover 6 attached, shields the sensor 14 from ambient radiation in the infra-red and visible portions of the spectrum.

Referring to FIG. 2, the shutter blade 11 is attached to the back of the elastic plate 2. The blade 11 is made of a material that is opaque to the energy radiated by the emitter 13. The switch 5 contains the emitter 13 and the sensor 14, positioned on the same optical axis and facing each other. The switch 5 is aligned so that its optical axis 12 goes through the aperture 8 in the blade 11 when the displacer 1 is not in a liquid and the blade 11 is in a vertical plane. Under these conditions, the emitter 13 irradiates the sensor 14. FIG. 2 is a top (or bottom) view when the invention is correctly positioned in the tank or sump.

Referring again to FIG. 2, the housing 4 is made liquid-tight by the o-ring 10 that is compressed by the cover 6. The cover 6 is penetrated by a sealing gland assembly 9 that enables the electrical cable 7 to exit the housing 4 without permitting any liquid to enter the housing 4. The electrical cable 7 is a liquid-proof multi-conductor cable that connects to the electrical terminals of the switch 5. The cable 7 is long enough to connect to a junction box or control unit that may be outside the tank or sump.

Figure 3:
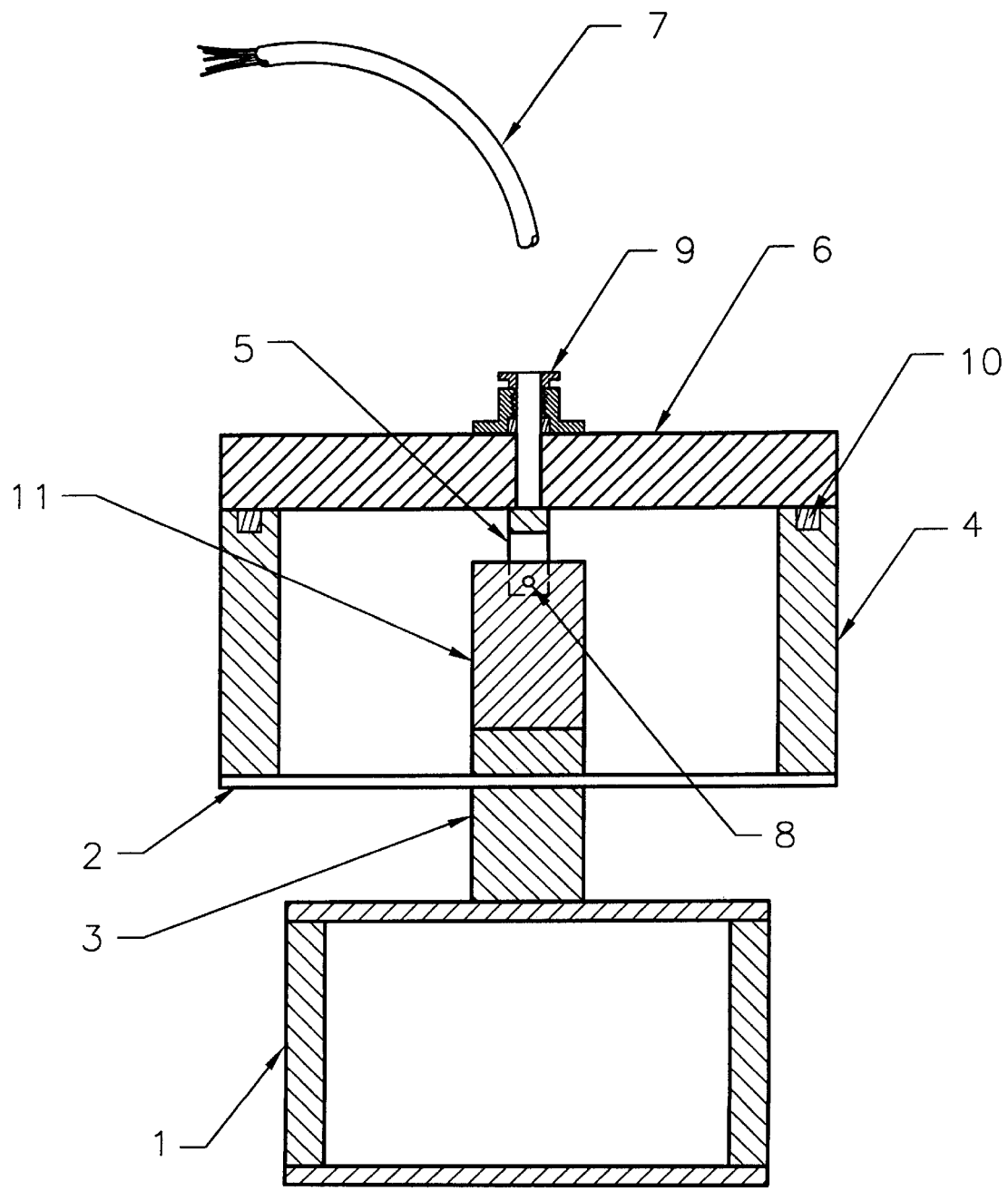
FIG. 3 is a section view of the invention, the section taken through the center of the invention in the plane of the shutter blade. This plane is vertical in the normal use of the invention.

Referring to FIG. 3, in this section view, the shutter blade 11 is in the plane of the paper. This is a side view when the invention is correctly positioned in the tank or sump.

Figure 4A:
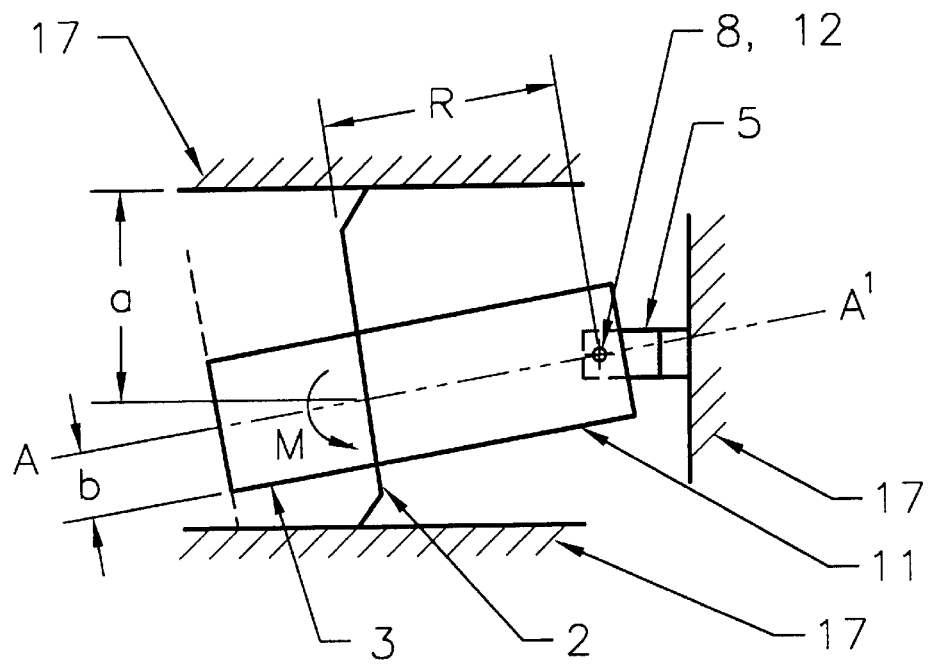
FIGS. 4a–4b are schematic drawings showing the relative positions of the slot switch optical axis and the shutter blade aperture.
Figure 4B:
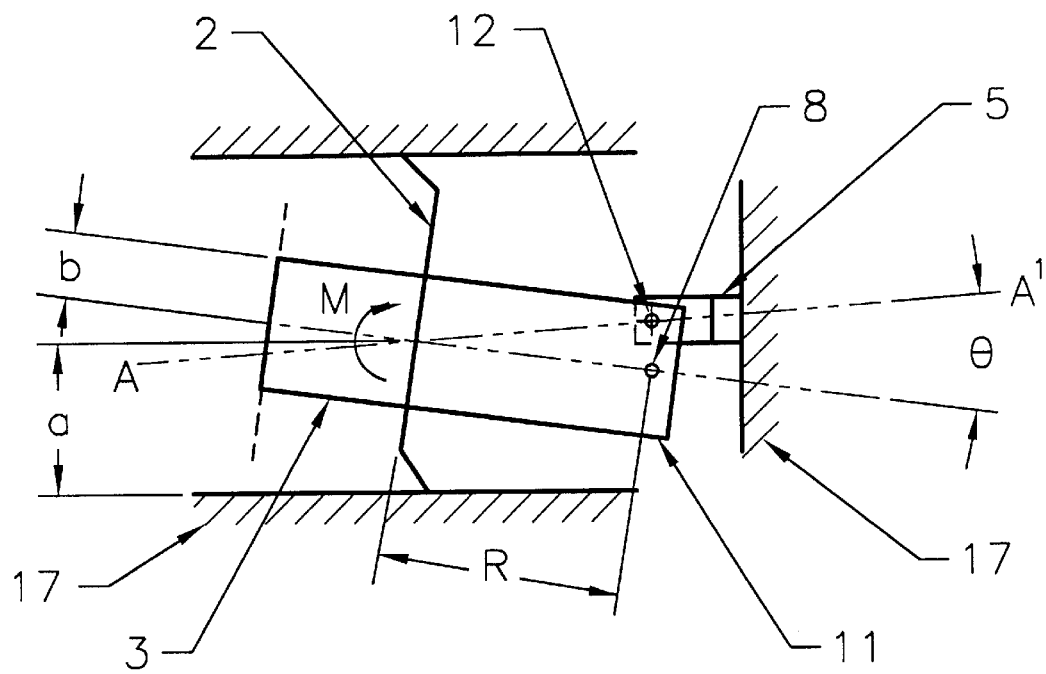

Referring to FIGS. 4a–4b, these two schematic views show only those parts related to the equations of operation of the invention: The cross-hatching 17 is a schematic symbol to indicate a fixed attachment. The dimension b is the radius of the trunnion 3. R is the distance from the center of the elastic plate 2 to the center of the aperture 8. The dimension a is the radius of the elastic plate 2. The moment force M is the moment caused by the forces that act on the displacer 1 (the displacer 1 is not shown for clarity), as transferred to plate 2 by means of the trunnion 3. The line A-A' is a line through the center of the plate 2 and the center of the aperture 8 of the blade 11.

FIG. 4a shows the case where the moment force M is due solely to the weight of the parts suspended from the plate 2. This corresponds with the displacer 1 (not shown) being out of the liquid. In this case, in addition to the line A-A' going through the center of plate 2 and the center of aperture 8, the line intersects the optical axis 12 of the switch 5. The emitter 13 can therefore irradiate the sensor 14. This causes the electrical output of switch 5 to be in one of its two possible states.

FIG. 4b shows the case where the moment force M includes, in addition to the forces of FIG. 4a, a buoyant force produced by immersion of the displacer in a liquid. (For clarity of illustration, FIG. 4b shows a buoyant force-induced moment greater than the sum of all the other moments.) The aperture 8 is thereby rotated (as compared to its position in FIG. 4a) through an angle represented in The Figure by the Greek letter theta. In this case, the aperture 8 is no longer on the optical axis 12 and the blade 11 therefore blocks radiation from the emitter 13 to the sensor 14. This results in the electrical output of switch 5 changing state.

In the preferred version, the invention is designed and constructed so that:

The plate 2 is a flat plate, of uniform thickness and of homogeneous isotropic material.

The plate 2 thickness is less than one-fourth of its least transverse dimension.

The maximum deflection of any point in the plate 2 (due to the load applied by trunnion 3) is not more than one-half the thickness of plate 2.

The plate 2 is nowhere stressed beyond its elastic limit.

The plate 2 therefore behaves as a flat plate, as described in the book entitled "Roark's Formulas for Stress and Strain"; the Sixth edition, by Warren C. Young, published by McGraw-Hill, ISBN Number 0-07-072541-1, Case No. 21b, entitled "Center couple on an annular plate with a fixed outer edge (trunnion loading), trunnion fixed to the plate."

The displacer 1, when immersed in the liquid, produces a buoyant force F, which is calculated from the following equation:

$$F=Pi*D^2*Lcf*rho/4$$

where:
Pi represents the ratio of the circumference of a circle to its diameter
D is the outside diameter of the displacer 1
Lcf is the outside length of the displacer 1
rho represents the density of the liquid in which the displacer is immersed
the asterisk (*) denotes multiplication
the superscript caret (^) denotes that the preceding value is to be raised to the power indicated by the value following the caret The buoyant force F produces a moment M at the center of the plate 2, where $$M=[(Lcf/2)+Ltr]F$$

Ltr being the length of the trunnion 3. M is shown in FIG. 4*b*.

The angular deflection at the trunnion 3 connection to the plate 2, theta, is, from the reference cited above ("Roark's Formulas for Stress and Strain"):

$$theta=(alpha*M)/(E*t^3)$$

where:
alpha is a constant related to the ratio of the trunnion 3 radius to the plate 2 radius
E is the modulus of elasticity (Young's Modulus) for the plate 2 material
t is the thickness of the plate 2

The trunnion 3 radius is denoted in FIG. 4*b* by the symbol b. The plate 2 radius is shown in FIG. 4*b* by the symbol a.

The angular rotation, theta, causes the aperture 8 to move through an arc length s, where s can be approximated as:

$$s=2*R*tan (theta/2)$$

where:
R is the distance from the center of the inside surface of plate 2 to the center of the aperture 8.
tan represents the trigonometric tangent function.

Since R is typically much larger than s, the error in the approximation that the aperture 8 displacement is linear is negligable. The movement, s, need only be somewhat greater than the size of the sensor 14 aperture. (Slot switch sensor effective apertures are typically in the range 0.01 to 0.05 inches.)

The flat plate-mode of operation, as described above, is the preferred version of the invention, but the invention is not limited to the flat plate mode. The invention also has efficacy when operated in a manner where the plate 2 behaves as a diaphragm (with deflections greater than its thickness), or as a membrane (where the plate 2 behavior is characterized primarily by tension forces in the plate 2 ).

The invention may be used singly, in applications such as marine bilge pump control, or two or more of the invention may be used in tanks or sumps to control the liquid level in the tank or sump. The terms and expressions which have been employed in the foregoing specification are used therein as terms of description and not of limitation. There is no intention, in the use of such terms and expressions, of excluding equivalents of the features shown and described or portions thereof, it being recognized that the scope of the invention is defined and limited only by the claims which follow.

What is claimed is:

1. A sensor for measuring a level of a liquid in a liquid containment space, comprising;
   (a) a sealable housing having an elastic plate as part of one surface of said housing;
   (b) a displacer attached to that surface of said plate that is on the outside of said housing, said displacer being sufficiently large to cause a change in the deformation of said plate when said displacer is immersed in said liquid;
   (c) at least one emitter of radiant energy in the infra-red portion of the spectrum and at least one sensor of radiant energy sensitive in the infra-red portion of the spectrum, said emitter and said sensor being located inside of said housing, said emitter being located on one side of a gap and said sensor being located on the other side of said gap, said emitter and said sensor positioned so that said energy from said emitter can transit said gap and enter the aperture of said sensor when there is no obstruction in said gap, said energy being of sufficient magnitude to cause a measurable change in the electrical output of said sensor, as compared to the electrical output of said sensor when said gap is obstructed;
   (d) at least one optical shutter, said shutter attached to the surface of said plate that is inside of said housing, said shutter being positioned in said gap so that said shutter does not block said energy when said displacer is not in contact with said liquid, said shutter size and shape being such that said shutter moves a distance sufficient to block said energy when the deformation of said plate is changed due to said displacer being immersed in said liquid.

2. The sensor of claim 1 wherein said emitter of radiant energy is capable of emitting in the visible portion of the spectrum and said sensor of radiant energy is sensitive in said visible portion of the spectrum.

3. The sensor of claim 1 wherein said shutter is positioned in said gap between said emitter and said sensor such that said shutter blocks said energy from entering the aperture of said sensor when said displacer is not in contact with said liquid, said shutter size and shape being such that said shutter moves a distance sufficient to allow said energy to enter the aperture of said sensor when the deformation of said plate is changed due to said displacer being immersed in said liquid.

4. The sensor of claim 1 further including a liquid-tight seal to provide for the penetration of multiple electrical conductors into said housing, said conductors providing for electrical connection of said emitter and said sensor to other devices.

5. The sensor of claim 1 further including a removable housing cover in conjunction with a liquid-tight seal for said cover.

6. The sensor of claim 1 wherein said emitter and said sensor are part of at least one commercially-available opto-electronic slot switch.

* * * * *